United States Patent [19]

Andermo

[11] Patent Number: 4,743,902
[45] Date of Patent: May 10, 1988

[54] MEASURING DEVICE FOR CAPACITIVE DETERMINATION OF THE RELATIVE POSITION OF THE TWO WITH RESPECT TO ONE ANOTHER MOVABLE PARTS

[75] Inventor: Nils I. Andermo, Taby, Sweden

[73] Assignee: Stiftelsen Institutet for Mikrovagsteknik vid Tekniska Hogskolan, Stockholm, Sweden

[21] Appl. No.: 942,016

[22] Filed: Dec. 12, 1986

Related U.S. Application Data

[63] Continuation of Ser. No. 558,427, Dec. 6, 1983, abandoned, which is a continuation of Ser. No. 272,072, Jun. 9, 1981, Pat. No. 4,420,754, which is a continuation of Ser. No. 964,961, Nov. 30, 1978, abandoned.

[30] Foreign Application Priority Data

Dec. 9, 1977 [SE]   Sweden ................................ 7714010

[51] Int. Cl.$^4$ ............................................. G08C 19/10
[52] U.S. Cl. ........................... 340/870.37; 340/870.01; 340/562; 340/347 P; 324/60 C
[58] Field of Search .............. 340/870.37, 562, 870.01, 340/347 P; 324/61 R, 60 R, 60 C; 318/662

[56] References Cited

U.S. PATENT DOCUMENTS

| | | | |
|---|---|---|---|
| 3,068,457 | 12/1962 | Nevius | 340/870.37 |
| 3,125,716 | 3/1964 | Machlis | 340/870.37 |
| 3,198,937 | 8/1965 | Wooster | 340/870.37 |
| 3,702,467 | 11/1972 | Melnyk | 340/870.37 |
| 3,723,866 | 3/1973 | Michaud et al. | 340/870.37 |
| 3,857,092 | 12/1974 | Meyer . | |
| 3,873,916 | 3/1975 | Sterki | 340/870.37 |
| 3,938,113 | 2/1976 | Dobson | 340/870.37 |
| 3,961,318 | 6/1976 | Farrand | 340/870.37 |
| 4,092,579 | 5/1978 | Weit | 340/870.37 |
| 4,182,981 | 1/1980 | Shum | 340/870.37 |

FOREIGN PATENT DOCUMENTS

| | | |
|---|---|---|
| 2017188 | 8/1971 | Fed. Rep. of Germany . |
| 2150928 | 5/1972 | Fed. Rep. of Germany . |
| 2217183 | 12/1972 | Fed. Rep. of Germany . |
| 2246660 | 5/1973 | Fed. Rep. of Germany . |
| 2254567 | 5/1973 | Fed. Rep. of Germany . |
| 2218824 | 6/1974 | Fed. Rep. of Germany . |
| 1523943 | 9/1978 | United Kingdom . |

Primary Examiner—John W. Caldwell, Sr.
Assistant Examiner—Mahmoud Fatahi-yar
Attorney, Agent, or Firm—Finnegan, Henderson, Farabow, Garrett & Dunner

[57] ABSTRACT

A system for measuring the relative movement of one object with respect to another, such as the movement of a slide with respect to a scale of a measuring instrument utilizes the capacitative effect of a series of electrodes associated with a slide and another series of electrodes associated with the cooperating scale, the changes in capacity caused by relative movement between the two members being analyzed by an electronic circuit.

3 Claims, 12 Drawing Sheets

MEASURING DEVICE FOR CAPACITIVE DETERMINATION OF THE RELATIVE POSITION OF THE TWO WITH RESPECT TO ONE ANOTHER MOVABLE PARTS

This is a continuation of application Ser. No. 06/558,427 (now abandoned), which is a continuation of Ser. No. 06/272,072 (now U.S. Pat. No. 4,420,754) which is a continuation of Ser. No. 05/964,961 (now abandoned) filed 12/06/83, 06/09/81 and 11/30/78 respectively.

The present invention refers to a measuring device for capacitive determination of the relative position of two with respect to one another moveable parts, for example the scale and the slide in a hand measuring tool.

More specifically, it is an object of the invention to provide a simple and cheap device with a good measuring resolution (0.01 mm) and low power consumption so that it can be used as a hand measuring tool, for instance a sliding caliper.

In the West German patent No. 2,246,660 there is described a capacitive angle measuring device which consists of a scale with a number of segments which is supplied by electrical pulses in a certain time sequence, whereby the signal from the detecting electrode on the moveable part of the measuring device is used for electrical determination of the position of this part.

This position determination is however only made in discrete steps corresponding to the graduation of the scale and the use of this principle for a resolution of more than 0.01 mm would imply unrealistically small segments on the scale.

In the West german patent No. 2,217,183 there is described a capacity length and angle measuring system which comprises a scale with two groups of electrodes, whereby the electrodes in each group are electrically connected to one another and the two groups are supplied with alternating voltages which are 180° phase displaced with respect to one another. The part moveable with respect to the scale, i.e. the slide in this measuring system is provided with a number of detecting electrodes which are connected to one another in groups whereby the phase position of these voltages are used for determination of the measuring value by means of interpolation.

The device according to the above cited patent will require certain cost and space consuming devices in order to make the interpolation linear. The patent furthermore requires an oscillator to be connected to the two electrode groups of the scale whereas the electrodes of the slides are to be connected to an evaluating electronics.

It is an object of the present invention to provide a device in which the above mentioned drawbacks are eliminated. In the capacitive length and angle measuring system according to the invention the electrodes of the scale are galvanically coupled nor to each other neither to the environment. All the electronics included in the system could therefore be located on the slide and it is not necessary to connect the scale with any wires or sliding contacts which would be limiting for the handling or the maintenance in for instance a hand measuring tool. As the electrodes of the scale are not coupled to one another it is also possible to effectively shield the electronic and the electrodes of the slide as well as the part of the scale close to the slide from the disturbance from the environment even if the scale in its remaining part is completely uncovered.

The invention will now be described in detail, reference being made to the enclosed drawing in which.

Figure 11:
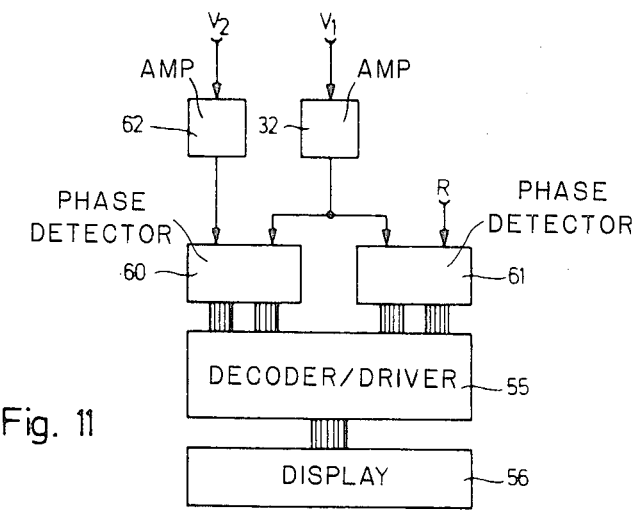
Figure 10:
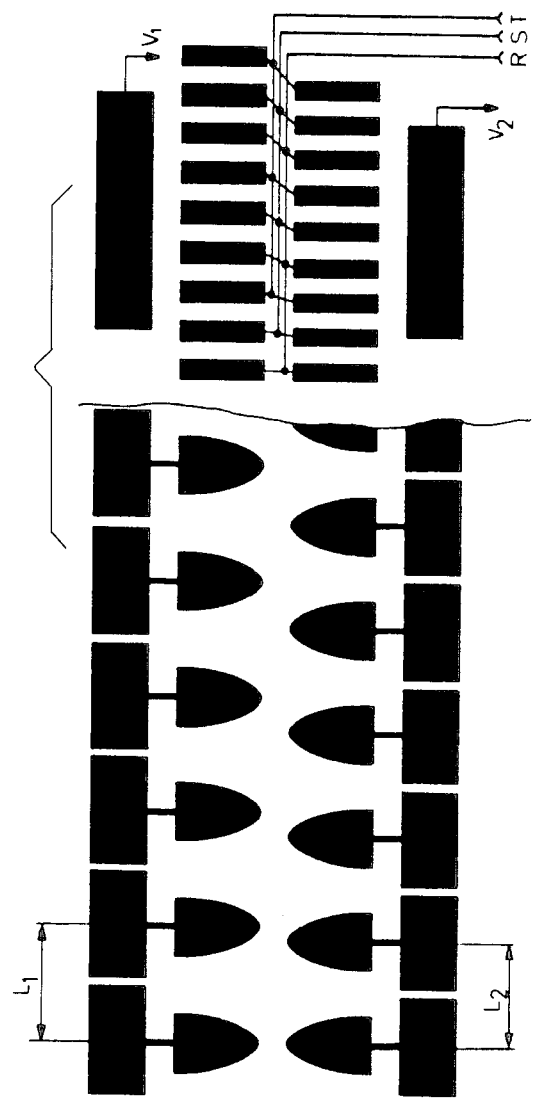
FIG. 10 is an embodiment of a scale and slide pattern for absolute measuring within a wider range than one period of the scale pattern.
Figures 12, 13:
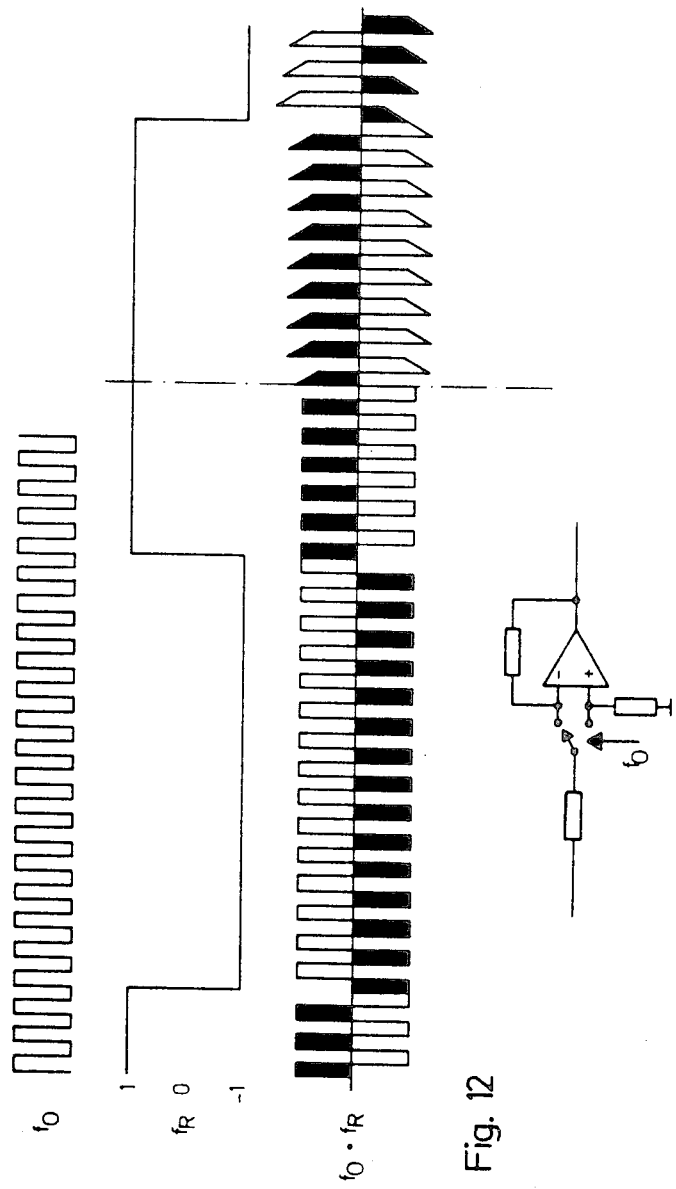
Figure 14:
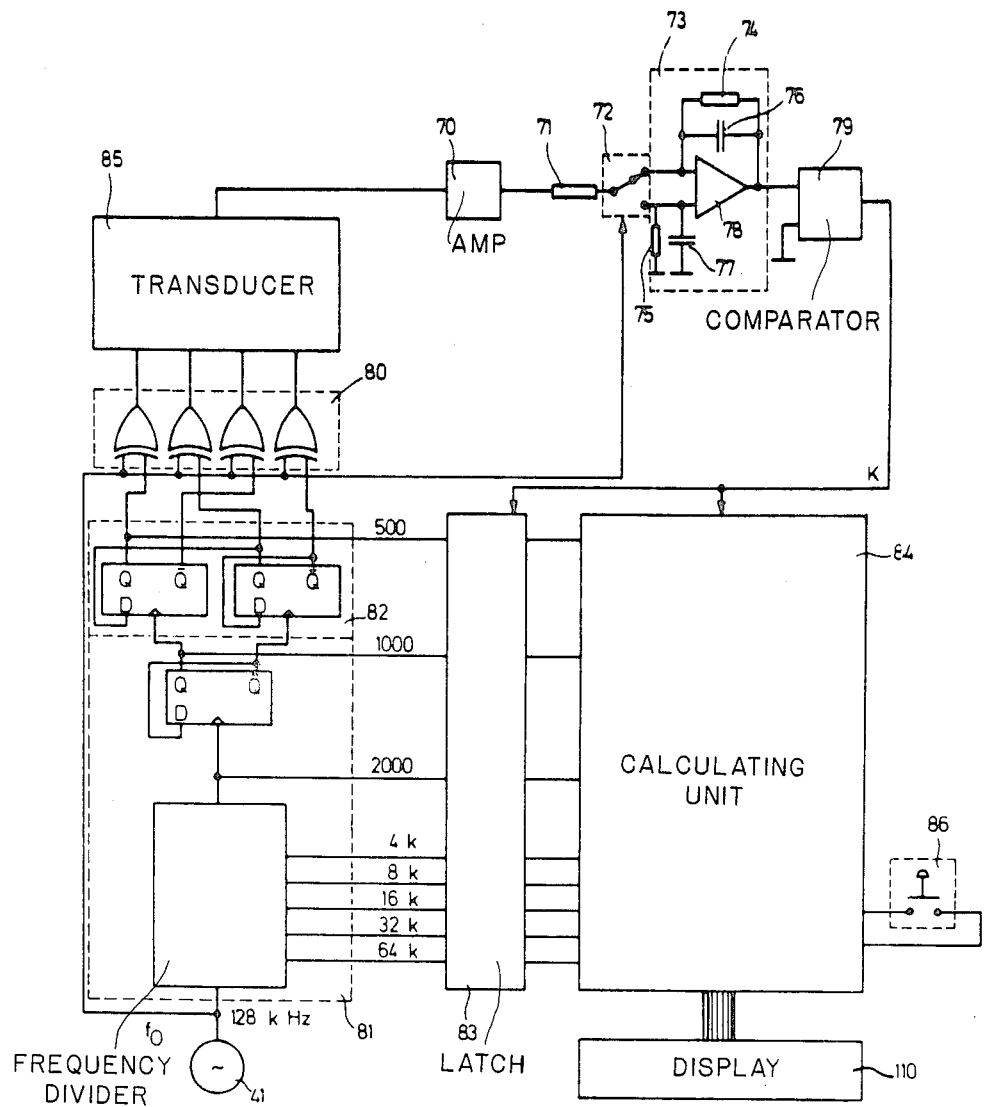
Figure 15:
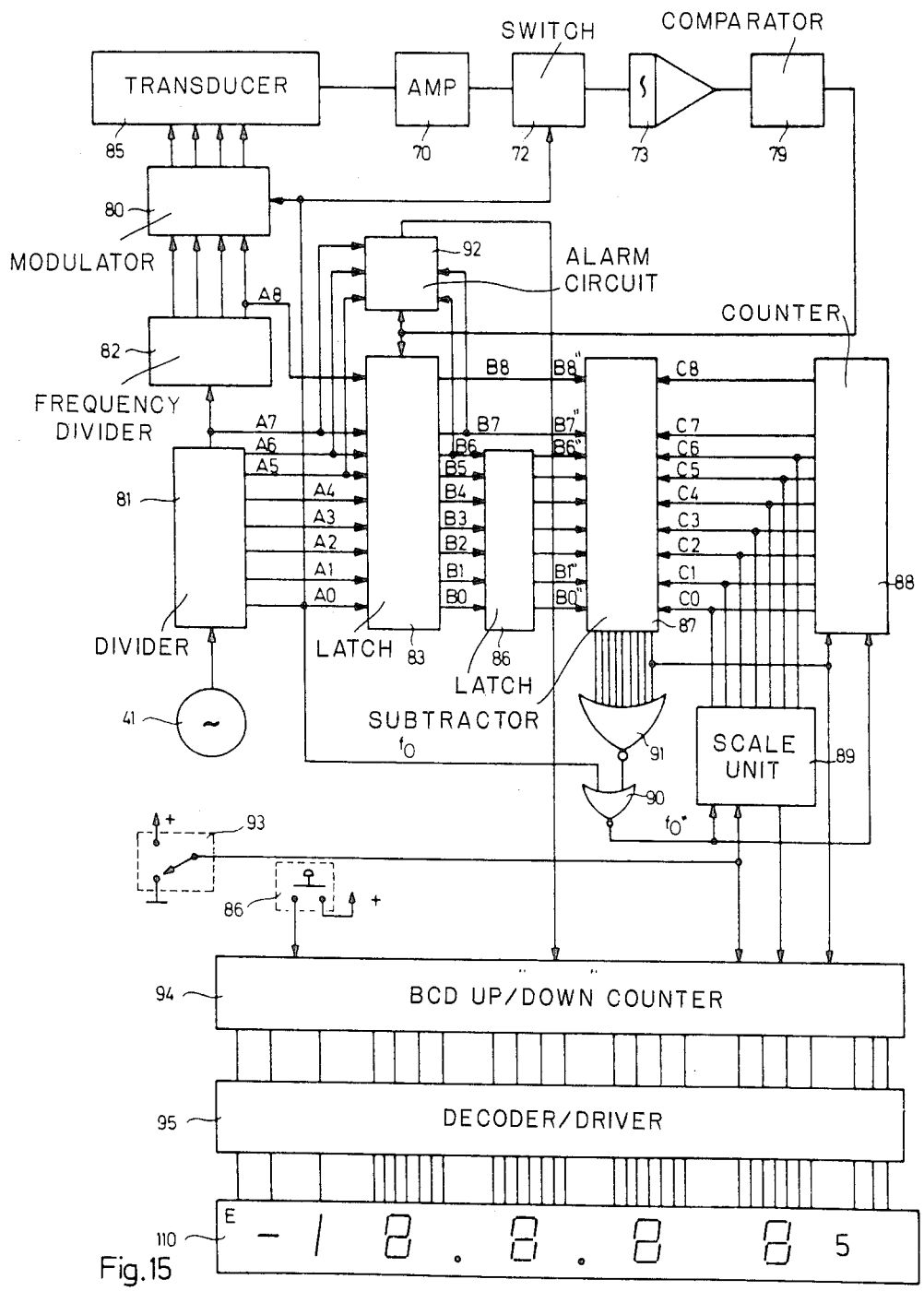
Figure 16:
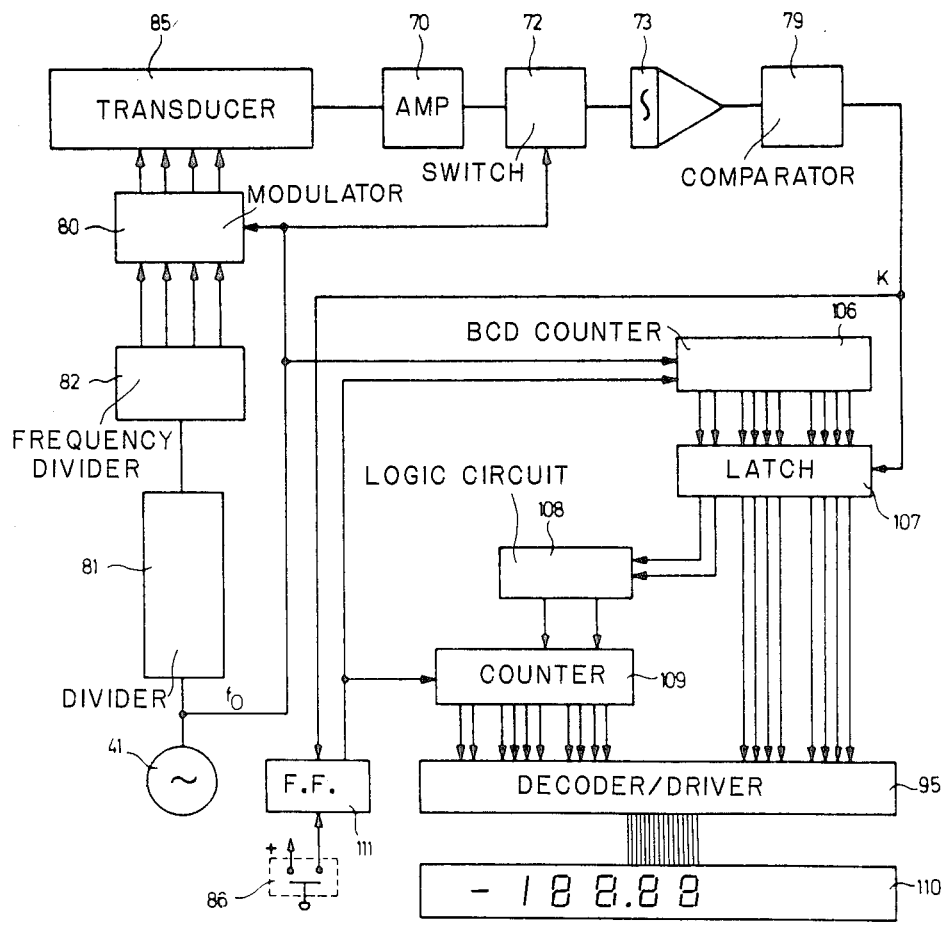

FIG. 11 schematically shows an electronics system for measuring by using a scale pattern according to FIG. 10;

FIG. 12 is a diagram of a supplying signal to be used in an apparatus according to the invention;

FIG. 13 is a synchronous detector to be used for detecting a signal according to FIG. 12;

FIG. 14 is a block diagram of an electronic system to be used in one embodiment of the invention;

FIG. 15 is a block diagram of another electronics system to be used in an apparatus according to the invention; and FIG. 16 is a further embodiment of an electronic system to be used in an apparatus according to the invention.

Figure 1:
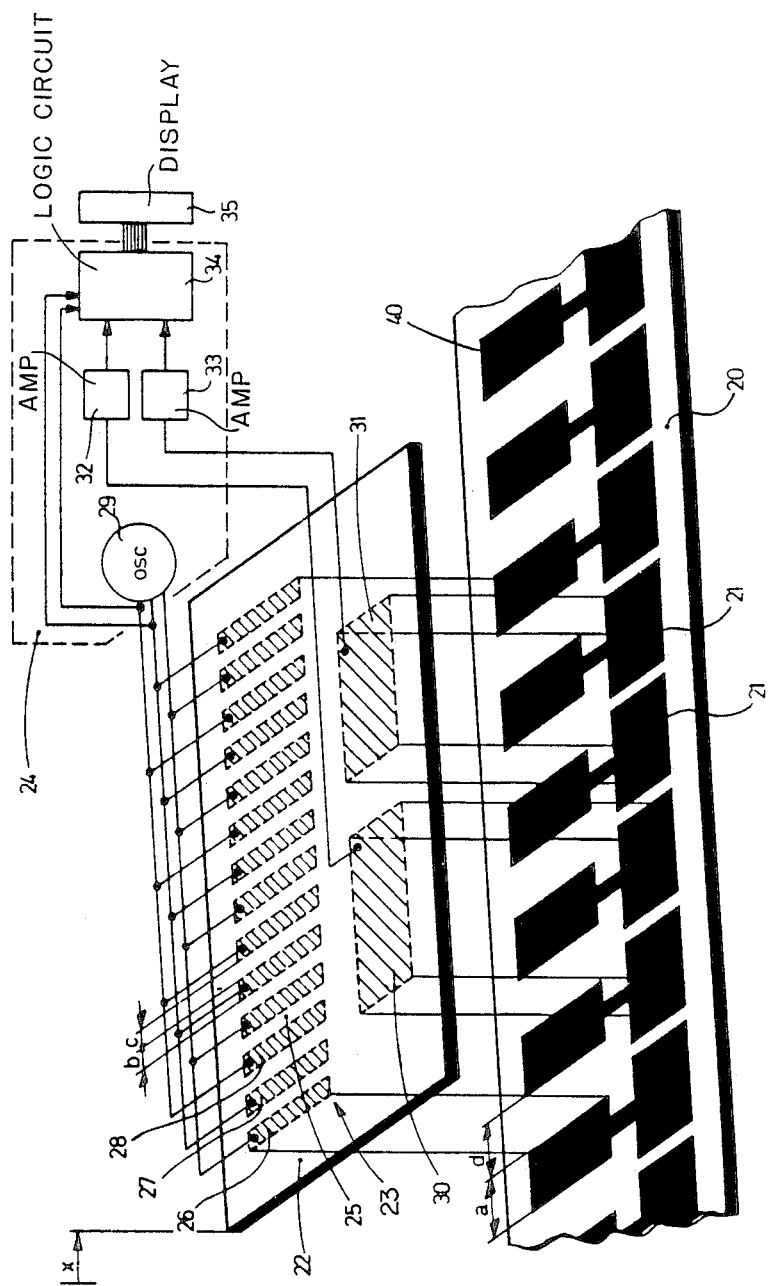
FIG. 1 shows a perspective view of a device according to the invention.

The capacitive length and angle measuring system according to the invention comprises according to FIG. 1 a scale 20 which is provided with electrodes 21. These electrodes are evenly distributed along the scale and are electrically isolated from each other and from the environment.

Above the scale a slide 22 moveable along the scale is located, the slide comprising an electrode pattern and an electronic part 24 attached to the pattern 23. The electrode pattern of the slide, FIG. 2, comprises an area 25 with basically rectangular electrodes 26, 27, 28. These electrodes have the same width b and an internal distance c from each other and are furthermore oriented parallel to each other in a direction perpendicular to the length of the scale. The electrodes are connected to each other in three groups in such a way that every third electrode in the area 25 belongs to one of the groups. The three groups are supplied with the three output voltages from a three phase generator 29. These three output voltages are identical in shape and amplitude but are mutually displaced in time by one third of the period. The electrode pattern of the slide also comprises two rectangular electrodes 30, 31 which have an extension in the length direction of the scale corresponding to several periods of the supplying pattern 25. These electrodes are connected to each one high imput impedance amplifier 32 and 33.

Figure 2:
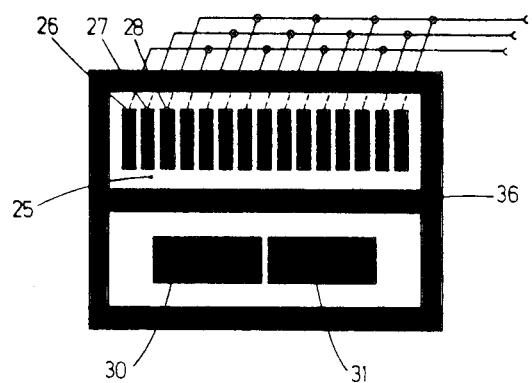
FIG. 2 is an example of the electrode pattern on the reading head.

FIG. 2 shows a top view of the electrode pattern of the slide. In order to avoid a direct coupling between the supplying electrodes in the area 25 and the receiving electrodes 30 and 31 a shielding pattern 36 is provided. This pattern consists of a conductive layer which has a shape according to the figure and is connected to a signal wise neutral point in the signal treating electronics.

Figure 7:
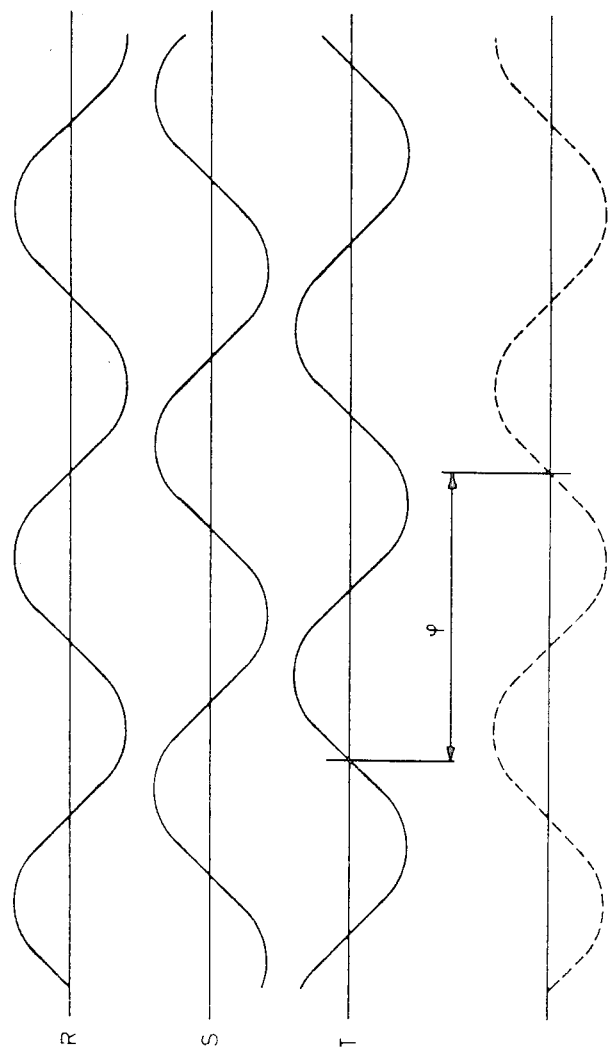
FIG. 7 is a time diagram for three phase sinus shaped supplying voltages and the voltage derived from the receiver of the system.

The ocillator 29 could be designed so as to generate sinus shaped voltages. The interpolation between the scale electrodes is thereby performed by measuring the phase angle of the voltage from the receiving electrodes (30 or 31) with respect to the oscillator 29. FIG. 7 shows the three supplying voltages R, S, T of the oscillator and by means of a dotted line the voltage obtained from the receiving electrodes 30 and 31. The phase angle will thereby by using a suitable design of the electrode pattern of the slide and the scale become a linear function of the displacement between the scale and the slide in the measuring direction.

Figure 3:
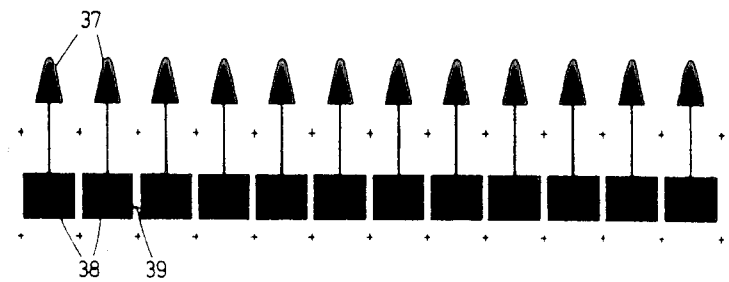
FIG. 3 is an example of the pattern on the scale to be used in a sinus shaped supplying voltage.

FIG. 3 shows a design of the scale electrode pattern of the scale 20 which is raised to such a linear interpolation with rectangular supplying electrodes according to FIG. 2 and a sinus shaped supplying voltage.

The electrode pattern according to FIG. 3 consists of detecting electrodes 37 and transferring electrodes 38 connected to these electrodes. The detecting electrodes have a shape which means that their extension along the direction of measurement follows the positive part of a sinus function having a length of period equal to that of the supplying pattern of the slide. Each such semi-sinus shaped detecting electrode 37 is connected to a transferring electrode 38. The detecting electrodes 37 of the scale are located within the area which are covered by the electrodes 26, 27, 28 of the slide when the slide is displaced along the scale. Between each transferring electrode there is a small isolated space 39 the extension and shape of which does not primarily affect the phase angle since all shielding and transferring electrodes located under the slide have essentially the same potention. It is, however, important for the signal amplitude from the receiving electrodes that these electrodes and the transferring electrodes have a big hugely covering surface.

In the above described design of the detecting electrodes a linear interpolation function will be obtain independently of the relation between the electrode width b and the electrode interval c of the supplying pattern (FIG. 1). This pattern can thereby be optimized with respect to desires of good transferring capacitance and limitations concerning isolation distances in the production technique used.

It is possible to increase the signal amplitude used by a factor 2 and simultaneously decrease the influence of possible external electrical disturbances in the system by using another detecting pattern identical to the pattern according to FIG. 3 but phase displaced by a half period in the measuring direction and having this pattern reversed relative to a line through the detecting electrodes. The pattern of the slide is thereby provided with further receiving electrodes on the opposite side of the supplying pattern with respect to the electrodes 30, 31. The useful signal from the receiving electrodes on the respective sides of the supplying pattern are now in opposite phase and are combined and could be amplified in a differential amplifier whereby external electrical disturbances having the same phase position on all receiving electrodes will be eliminated.

The electronics unit 24 comprises in addition to the oscillator 29 and the signal amplifiers 32, 33 a logical unit 34 which converts the phase shift to a measuring value which is presented on a display 35. The unit 34 is provided with at least two reference phase signals from the oscillator whereby it is possible by means of incremental counting to count the number of periods passed in the scale pattern as well as to perform the interpolation within the period by means of the phase measuring.

The splitting of the receiving electrodes in two parts 30 and 31 with appertaining amplifiers 32 and 33 has been made in order to make the system self-controlling with respect to errors that might araise because of dirt or mechanical damages on the scale and the supplying pattern. The logical unit 34 is designed and programmed in such a way that it alternatively measures the two measuring channels. If the result from these measurements is not identical an error indication is obtained and the electrode patterns will be controlled and cleaned by the operator. When manufacturing a complete low cost system using electronics it is advantageous to use a digital technique to the highest possible extent. In the above described system the sinus voltage is suitably obtained in a digital sinus generator by means of splitting the sinus period in a large number of pulses of a constant amplitude but with a varying width so that the signal after passing a filter is giving the desired pure sinus shape. This filter can be located between the oscillator and the supplying pattern whereby it should be designed so as to treat all supplying phases equally with a high accuracy. Filters can also be connected between the amplifiers 32, 33 and the logical unit 34.

Figure 8:
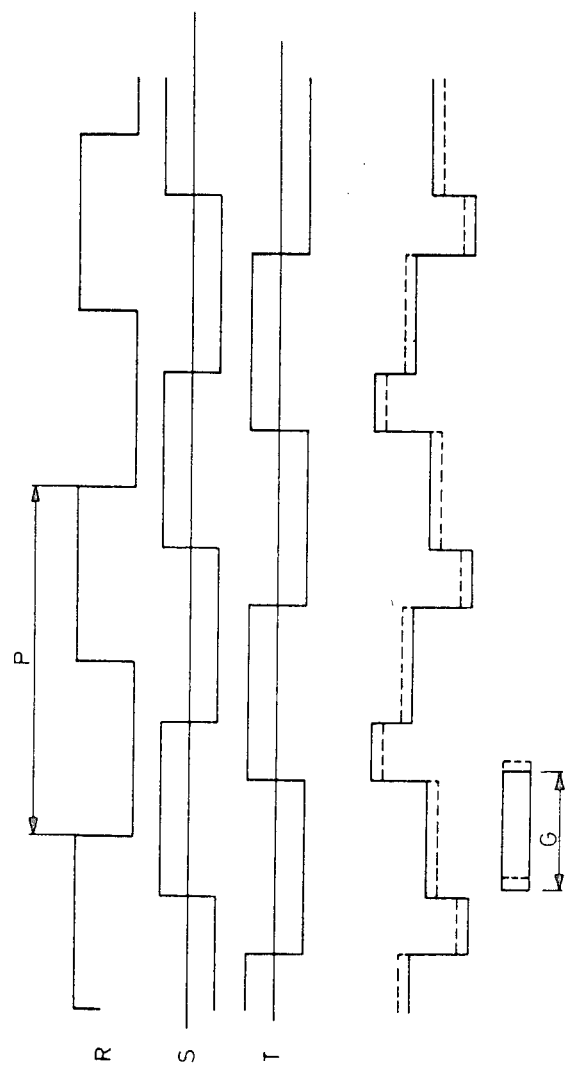
FIG. 8 is a time diagram of three phase rectangular shaped supplying voltages and an example of the signal obtained from the receiver of the system.

A further simplification and reduction of cost of the electronics in the capacitive length and angle measuring system is obtained by using a design which permits supplying the supplying electrodes with rectangular waves of the basic frequency of the device. FIG. 8 shows these supplying voltages (R,S,T) for a three-phase system and the signals ("signal") thereby obtained from the receiving electrodes 30, 31. In this system it is not possible as in the system using sinus voltages to use the zero passages of the receiving signals to detect the position. The zero passages will namely be stepwise displaced between a number of fixed positions when the slide is moved along the scale. If, however, the electronics forms the average value of the signal within a time gate ("gate" in FIG. 8) a voltage will obtained which is a function F(x,y) of the position of the gate (y) with respect to the supplying voltages and of the position (x) of the slide with respect to the scale. With a suitable dimensioning of the length of the gate and of the width and the shape of the electrodes of the scale system it is possible to make the function F(x,y) to become zero at a predetermined relation between x and y.

$$F(x, y)=0 \text{ for } x-N L=ky$$

where
N=an integer
L=the period length of the supplying voltages
k=a constant

Figure 6:
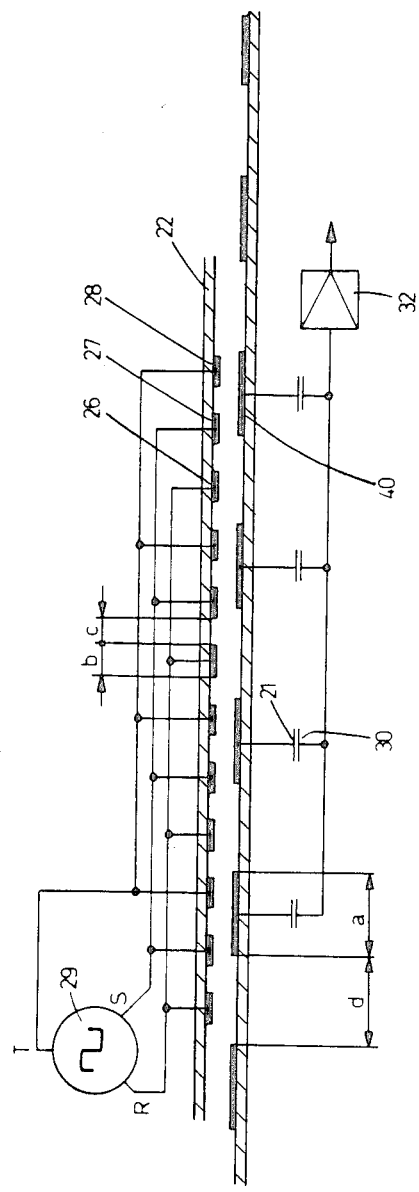
FIG. 6 is a cross section along the supplying electrode of the scale and slide.

FIG. 6 shows a cross section through the slide and the scale for such a dimensioning of the electrode pattern. Here the width b is equal to the interval c for adjacent rectangular supplying electrodes. The rectangular electrodes of the scale have a width a which is equal to two times the width of the supplying electrodes plus the interval c. The scale electrodes are distributed along the scale with the same periodical split L as the period length of the n-phase supplying pattern. The gate time G should be equal to the time difference between adjacent phases in the n-phase system. The prerequisite for obtaining a linear relation between x and y in this case could thus be summarized as follows:

$c = b$
$a = 3b$
$d = L - a$
$G = 1/n \cdot P$
$P$ = Period time of the supplying voltage By using this dimensioning of the electrode pattern and the gate time it is possible to design a simple electronics unit which automatically presents a measuring value corresponding to the position of the slide with respect to the scale in terms of electrical signals to be transferred to a figure display or for use in controlling a mechanical position.

Figure 9:
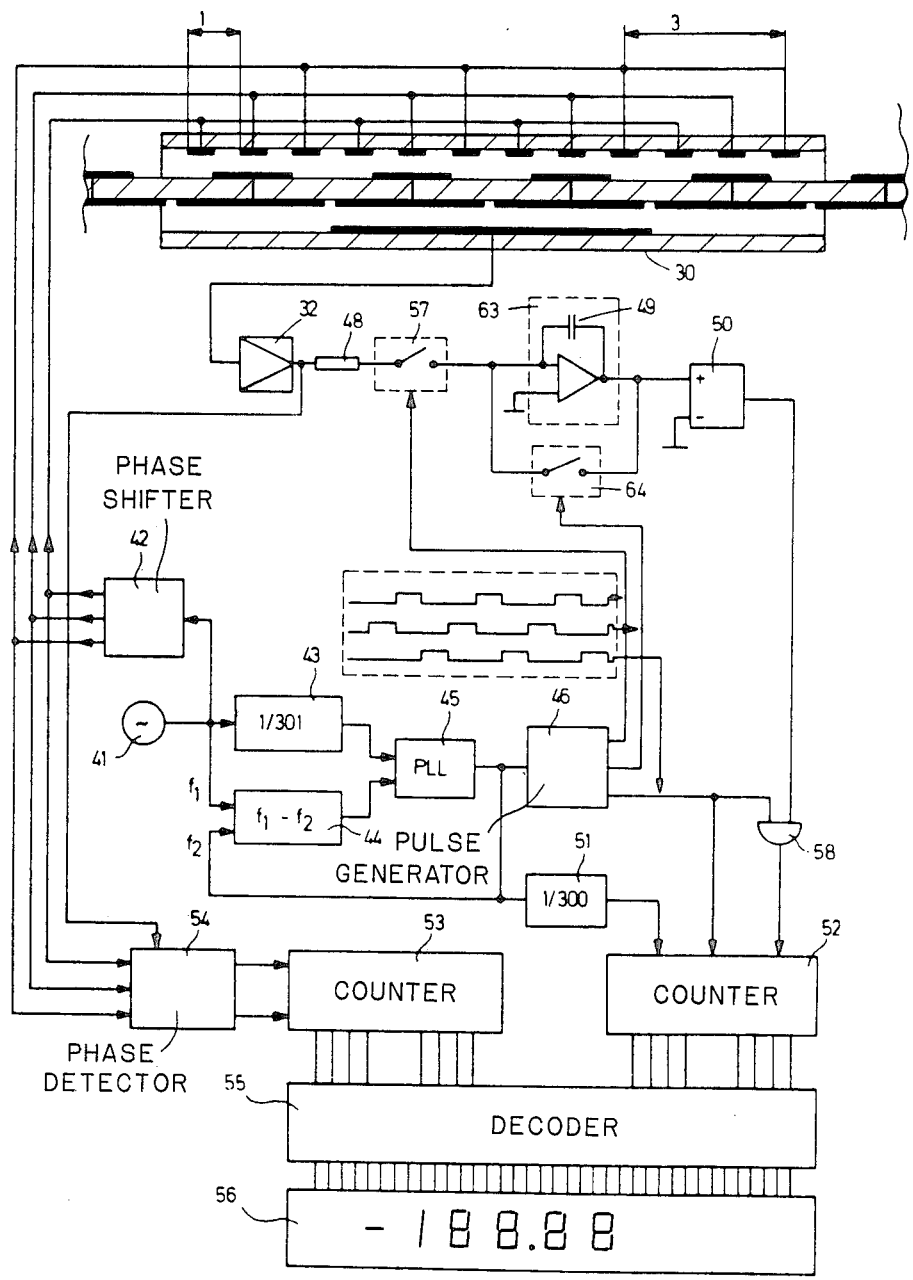
FIG. 9 is a block diagram of an embodiment of the electronics of the system.

In FIG. 9 there is shown an example of such an electronics unit. In this unit the three rectangular voltages R, S, T are generated by splitting a frequency $f_1$ of for example 30 kHz from an oscillator 41 in the unit 42 by three under three different phase-displacements each corresponding to one third of the period of time of the output voltages.

The unit 45 is a phase locked circuit which could be designed for instance as the CMOS-circuit CA 4046. This circuit contains a voltage controlled oscillator, the frequency of which is controlled by a phase sensing circuit, so that the two input frequencies $f_{11}$ and $f_{12}$ are made to be exactly identical. The frequency $f_{11}$ is obtained by dividing the frequency $f_1$ and the output frequency $f_2$ from the unit 45. This means that the frequency $f_1$ is controlled in such a way that $f_1 - f_2 = f_1/301$ which is equivalent to $300 f_1 = 301 f_2$ In the unit 46 there is generated a pulse, the length of which is equal to one period of the frequency $f_2$ and the frequency of which is equal to $f_2/3$. The phase position with respect to the supplying frequency $f_0$ of the scale will be displaced 1/300 of the period of time $f_0$ for each period of the gate pulse (corresponding to 1/100 mm if L=3 mm). Within a time space of three hundred gate pulses the phase position of the gate pulse relative to the signal voltage of the scale will sweep along all possible values in steps corresponding to 1/100 mm. The gate pulse controls the switch 57 so that the switch is closed during the gate period. The integrator 63 forms the average value of the signal during this time. Immediately before starting of the gate time the integrator has been set to zero by the switch 64 which is controlled by a pulse from the unit 46. The output voltage of the integrator is coupled to a comparator 50 which detects whether the integrator voltage is positive or negative. During the period of time following immediately after the gate time the output of the comparator is connected to the counter 52 via the gate 58. When the average value of the signal during the gate time passes zero from a negative value to a positive value the counter 52 will be stopped. This occurs at a point of time within the sweep which is a function of the mechanical position of the slide with respect to the scale.

In the unit 51 the frequency $f_2$ is divided by 900 whereby a rectangular wave of the same frequency as the sweep is obtained, but having a phase position which is independent of the mechanical position of the measuring device. This rectangular wave from the unit 51 will thus be a reference when determining the displacement of the phase position for the zero passage of the comparator 50 when the slide is mechanically displaced with respect to the scale. A zero setting of the phase position of this reference voltage so that it coincides with the phase position of the output voltage of the comparator when the slide is in its mechanical position can easily be provided by means of zero setting (Reset) of the counter in the unit 51 when the output voltage of the comparator changes its logical level from zero to one.

The unit 52 is a counter which is reset and started by a change of the output voltage from the unit 51, and upon being started counts pulses from $f_2$ until a corresponding change is reached from the comparator 50 via the gate 58. The number of pulses thereby counted corresponds to the number of 0.01 mm displacement of the slide with respect to the scale from the zero position within the period (3 mm) of the supplying pattern.

For determining the number of periods which the slide has been moved along the scale the measuring signal is detected after having passed the amplifier 32 and is transferred to the unit 54. This unit can be using technique known per se by means of reference phases (R,S,T) from the phase splitter 42 of the oscillator detect the phase displacement of the measuring signal due to the movement of the slide along the scale in increments of $\frac{1}{3}$ of the supplying signal period corresponding to 1 mm movements of the scale. The unit 54 can also determine the direction of movement and generate pulses for incrementing or decrementing of the counter 53 in correspondence with the displacement of the scale. The counter 53 is set to zero when the scale system is set to zero whereafter it gives a number on its output corresponding to the deviation in logic from the zero position in millimeters.

The output signal from the counter 52 and 53 is adopted in the unit 55 so as to drive a figure display 56. Alternatively the output signals from the counter 52 and 53 could be used for external treatment and possible control of a part of a machine, the position of which is detected by the scale system.

Figures 4, 5:
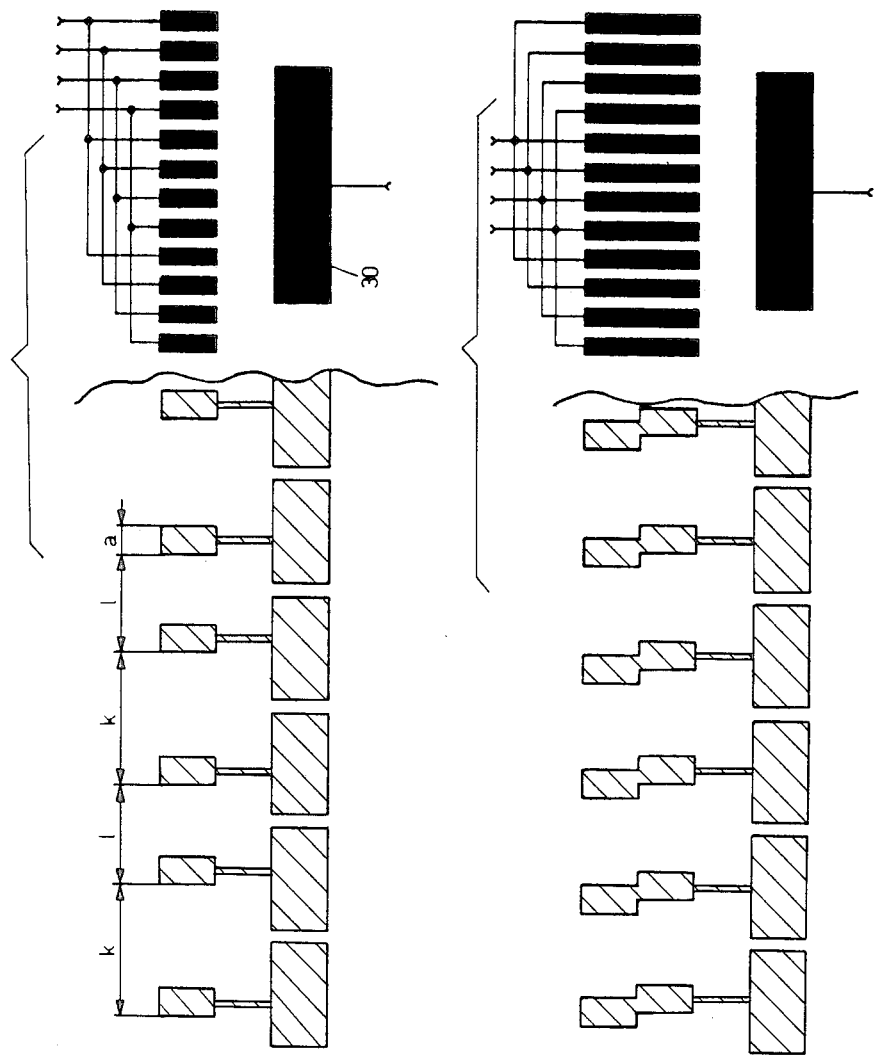
FIG. 4 is an embodiment of the scale with an appertaining supplying pattern on the slide to be used for rectangular wave supply.
FIG. 5 is another embodiment of the scale with an appertaining supplying pattern on the slide to be used for rectangular wave supply.

FIGS. 4 and 5 show two other embodiments of the electrode pattern for the scale and the slide to be used in the system with four or more phases. In the scale pattern according to FIG. 2 every second detecting electrode has a displacement in the direction of measuring which is equal to L/2n from the regular split L. L is equal to the length of the supplying pattern and n is number of phases. The receiving electrode 30 should have a length equal to an even number of period lengths L. The width of each detecting electrode is equal to L/n.

In the electrode pattern according to FIG. 5 the detecting electrodes are evenly distributed with the period L but each electrode consists of two equally sized parts each having the width L/n having an inherent displacement in the measuring direction of L/2n.

The two scale patterns according to FIGS. 4 and 5 shall have a width b of the supplying electrodes and an interval c=L/2n and the gate length G of the electronics according to FIG. 9 G=2P/n.

The capacitive length and angle measuring system according to the invention can also be designed so as to make possible an unambiguous determination of the mechanical positions without any continuous control of the movement of the slide through counting of the number of periods passed.

FIGS. 10 and 11 illustrate such an embodiment of the system. The scale according to FIG. 10 has been provided with two rows of electrodes with the division L and $L_2$, respectively. The slide is provided with corresponding n-phase supplying patterns with the period length L and $L_2$, respectively. The electrode patterns of the scale and the slide comprise for each row of electrodes as in the previously described embodiments transferring electrodes so that from the slide two signals $V_1$ and $v_2$, respectively are obtained for treatment in the electronics part. The position within each period of the pattern is determined as above through phase measurement of the voltage $V_1$ with respect to one of the supplying phases, for instance R. By measuring the phase angle between the two signals $V_1$ and $V_2$ it is furthermore possible to make an unambiguous determination of the position within a long path M which has an extension M as follows:

$$M = L_1 \cdot \left( \frac{L_1}{L_1 - L^2 y} \right)^{-1}$$

Ex. $L_1 = 3$ mm, $L_2 = 3\ 100/101$ mm. Thus $M = 300$ mm.

FIG. 11 shows a block diagram of an electronics to be used for such an unambiguous absolute measuring of the position of the slide above the scale. References 32 and 62 denote amplifiers with a high input impedance for the signals from the two receiving electrodes of the slide. The signals $V_1$ and $V_2$ thus amplified are supplied to the unit 60 and 61 whereby the unit 60 determines the coarse position of the slide through measuring of the phase angle between $V_1$ and $V_2$. In the unit 61 the exact position of the slide is determined in the similar manner through measuring of the phase angle between the signal $V_1$ and one of the phases (R) of the supplying oscillator of the slide. The units 55 and 56 are cosigned as in the corresponding units in FIG. 9, Decoder/Driver and Display unit, respectively.

The system described in connection with FIG. 10 is designed to be used with a three phase sinus voltage. It is, however, possible also to modify the above described system to be used with a rectangular wave voltage in a corresponding way so that an unambiguous measurement of the position of the slide with respect to the scale can be made.

In the system where the scale is supplied with a rectangular wve it is important for the linearity of the interpolation that the shape of the signal is not changed before the integration along the time gate "G". A problem is that the signal is coupled from the scale with a very low transferring capacity. In practice the supplying impedance for the signal from the amplifiers 32, 33, 62 is not more than one pico farad. It is therefore necessary with some sort of direct voltage connection to ground from the amplifier inputs. In the compact design of the electronics which is desirable when used as a hand tool it is in practice difficult to use resistances of a higher value than a few ten megaohm. One will thereby obtain at the amplifier input a high pass filter effect with a time constant of for instance 200 us. With a measuring frequency $f^0$ of 10 kHz one will thereby obtain a deviation from a linear interpolation function which is not neglectable in comparison to the desired resolution of 1/100 mm.

It is possible to reduce considerably the above described problem in a system where the scale is supplied with a high frequency signal which for the n inputs is modulated with the n phases of a relatively low frequency. After the modulation in a synchronous detector controlled by the HF-signal one will in the receiver obtain a signal consisting of a combination of the low frequency input phases of the same principle appearance as "signal" in FIG. 8. The high frequency modulation involves an increased tolerance with respect to resistive shunting of the transfer capacitance in the capacitive scale system because of the reduced capacitive transferring impedance. One will furthermore achieve that a resistant shunting of the transferring impedance due to for instance contaminants on the scale, will not affect the relative shape of the LF-envelope but will only involve a linear decrease of the amplitudes. Thus, the measuring value received will be unaffected until the resistive load is so heavy that the detected LF-signal has had a considerable decrease of its amplitude.

In FIG. 12 there is shown an example of the above described signal. The low frequencies rectangular wave signal is multiplied with a high frequency signal whereby a HF-signal with a constant amplitude and a phase which alternates with the LF-modulation is obtained.

The synchronous detector could be designed as shown in FIG. 13. The input signal will thereby be shifted between the positive and negative input of the amplifier by means of a switch controlled by the HF-signal $f_0$. Thereby the shaded parts of the modulated signal in FIG. 12 will be connected to the positive input of the amplifier whereas the remaining parts of the signal will be connected to the negative input.

In the left part of FIG. 12 there is shown how the signal is changed after passing a high pass filter, corresponding to the resistive load due to contaminants on the scale. One realizes that the signal after passing a demodulator according to FIG. 13 will be mainly in accordance with the low frequency signal $f_R$ even at a rather high resistive load on the scale.

In FIG. 14 an electronic system is shown, where the above described principle with a HF signal multiplied with a LF square wave is applied. A frequency F° of for instance 128 kHz from the oscillator 41 is in a 7 step binary frequency divider divided down to 1 kHz. In unit 82 a further division with two is made and four 500 Hz square waves with equal spaced phase positions is made. The four 500 Hz signals are in the modulator 80 combined with $f_0$ and the transducer 85 will be fed by four 128 kHz signals, which change phase by 180° according to the polarity of the resp 500 Hz signals.

The part of the signals which are coupled through the transducer to its output is amplified in the amplifier 70. Then it is demodulated and integrated in the units consisting of the resistor 71, the switch 72 and the integrator 73. The switch 72 is controlled by the f° frequency demodulated and the LF signal remains for integration. The resistors 74 and 75 in the integrator have a high value, the resulting time constant with the capacitors 76 resp 77 being much higher than the period time of the LF signal. The output signal $U_{f0}$ from the integrator is a sum of two triangular waves with ¼ period phase difference and amplitudes which are a function of the transducer positions. The zero crossings of the composed wave will be detected by the comparator 79. The comparator output K will be a square wave with a phase position relative to the transducer LF input modulation, which is a function of the transducer position. The positive-going edge of the square wave will trigger the latch unit 83 which latches the binary value of the frequency divider chain 81–82 at the instant. Thus the latch unit 83 will on its output give a binary value representing the position of the transducer within the period of the scale pattern.

The output from the latch will in the calculating unit 84 be processed and the following functions can be performed:

(a) Correction for remaining unlinearities in the scale interpolation function: Phase position of K=f (transducer position)

(b) Calculation of coarse position i.e. the number of periods in the scale pattern which the transducer is moving. This information is obtainable from successive latch outputs if the transducer movement between successive K periods is smaller than half a period in the transducer pattern (c) Zero setting: Upon operation of the switch 86 the calculating unit registers the actual position value and thereafter calculates the transducer movement from that value.

(d) Adaption of the scale factor for the transducer for mm or inch reading.

(e) Transformation of the measurement value of a form suitable for driving the display unit 110.

These functions can be performed in a u-computer programmed for the wanted operations. In application of the invention in a digital caliper it is however very important to get a compact and cheap solution.

In FIG. 15 a solution for the electronic system is shown, which is advantageous in component count and well suited for integration in a few monolitic circuits. The system in FIG. 15 is similar to the system in FIG. 14 regarding the blocks 41, 70–83. The output (B) from the latch 83 is in the unit 86 adjusted for unlinearities in the scale function whereafter a new binary value (B') is contained which is fed to one side of the subtractor 87. To the other side of the subtractor the output (C) of a binary up/down counter is connected. The unit 86 can be a read-only-memory (ROM) of known kind. When the (C) value is not equal to the (B'') value the gate 90 is open and $F_0$-pulses are fed to the counter 88. The most significant bit (MSB) of the output from the unit 87 is used as a signal (Up/Down) for controlling the counting direction of the counter 88 corresponding to the direction of movement of the transducer.

When the counter value (C) reaches equality with the value (B') the gate 91 gives a high output to the NOR gate 90 and the gate closes for the $f_0$ pulses and the counter 88 stops.

The clock pulses $f_0$ to the counter 88 are also fed to the unit 89, which removes a suitable number of the pulses in the pulse train $f_0$, giving a new pulse train $f_m$ adapted for mm or inch scale factor.

The unit 94 contains a BCD up/down counter. It is clocked by the pulse train $f_m$. The counting direction for this counter and the counter 88 is controlled by the same signal. Thus the counter in unit 94 will follow the movement of the transducer 85 with the proper scale factor for inch or mm according to the setting of switch 93.

The unit 95 is a decoder/driver for adapting the BCD output from unit 94 to the coding and driving requirements of the display unit 85.

The unit 92 is included in the system for checking the speed of movement of the transducer. If this speed is to great the unit 92 will give an error alarm, which will be latched in unit 94 and an error message will be displayed on the display unit 110.

Zero set of the measuring system will be made by pressing the switch 86 whereby the counter and the error latch in unit 94 will be reset to zero. In FIG. 16 an electronic system for a digital caliper is shown. It is based on the principles for a linear scale function as described above and contains the continuous integration of the LF signal.

The oscillator 41 is delivering for instance 200 kHz to the frequency divider 81. This divides the frequency by 200 and the unit 82 will give a four-phase square wave output of 500 Hz. In the modulator 80 the four LF phases will be multiplied by the 200 kHz frequency and the transducer will be fed by the four resulting HF signals. The output of the transducer will be amplified in unit 70, multiplied with the 200 kHz in the demodulator 72 whereafter the resulting signal is integrated in the integrator 73. The zero crossings of the integrator output signal are detected by the comparator 79, whose output K will be a square wave with a phase position relative to the four phase LF signals from unit 82, which is a function of the transducer position.

The unit 106 is a BCD counter which is clocked by the 200 kHz signal. It has a counting cycle of 400 pulses and thus runs synchronously with the divider chain 81–82. When the switch 86 is closed the counter 106 is set to zero by a reset signal from unit 111. This reset signal is triggered by the leading edge of the K pulse. Unit 107 latches the output of the counter 106 for each leading edge of the pulse K.

The output of the latch 107 thus will represent the position of the transducer 85 within the scale period relative to the zero setting. In unit 108, a logic network is sensing the change of output value on the two most significant bits of the latch 107, representing foru one-mm steps in transducer movement. Provided that this movement never is more than one mm pro K-pulse, the unit 108 will then correctly give clock pulses and direction signal to the coarse counter 109, which will indicate mm count for the transducer movement.

The outputs from the coarse counter 109 and the fine latch 107 is in the decoder/driver unit 95 transformed to signals for driving a digital display 110.

The examples of the design of the invention given above have been related to a measuring tool or measuring linear mechanical displacements. It is however also possible to design the scale system for measuring of angular positions whereby the scale for instance is made as a band on the outer territory of a cylinder and the slide being located on the inside of another concentric cylinder. Another way of redesigning the linerally extending scale system to a circular scale system is to perform a transformation of the system for the scale and the slide so that the linearly extending coordinate X is equivalent to an angular coordinate. The scale and the slide would then be designed as two discs on a common axis being located close to each other.

By using the electronics according to for instance FIGS. 9 and 11 it is thereby possible to obtain a simple and cheap measuring system without any mechanical load on the measuring object, the system having the possibility of generate accurate information of the angular position in digital form.

We claim:

1. A measuring device for capacitative determination of the relative position of two relatively movable parts with respect to one another comprising a slide provided with a number of groups of supply electrodes distributed along the direction of relative movement, each of the groups having n number of supply electrodes, n being an integer greater than 2; signal generator means having n number of signal outputs, each of the supply electrodes in each group being connected to a respective one of said signal outputs whereby all supply electrodes are supply with voltages according to a cyclic pattern, the slide also being provided with at least one receiving electrode; a signal processing unit connected to at least one receiving electrode; a scale being provided with a single electronic pattern comprising internally galvanically isolated scale electrodes, each scale electrode comprising two mutually galvanically connected parts, one being a detecting part and being located close to the area of the scale over which the supply electrodes of the slide can be moved, the other of the two parts being a transferring part and being located close to the area over which the at least receiving electrode of the slide can be moved, whereby the position of the slide along the scale determines the signal from the at least one receiving electrode which is derived from at least two adjacent supply electrode signals and the position of the slide with respect to the scale can be determined by the identification in the signal processing unit of the phase position of said signal from the receiving electrode.

2. The measuring device according to claim 1, wherein said signal generator means having n number of signal outputs generates n periodical signals of the same amplitude and frequency whereby the signals are phase displaced with respect to each other by $N \cdot (360/n)$ degrees, where N is an integer.

3. The measuring device according to claim 2, wherein the n phase generator means includes means to supply electrodes with a rectangular voltage and the signal from said at least one receiving electrode is subject to an average value determination during a particular time period whereby the received voltage is a function of the phase position of the time period with respect to the rectangular voltage and of the position of the slide with respect to the scale.

* * * * *

(12) EX PARTE REEXAMINATION CERTIFICATE (5371st)
United States Patent
Andermo

(10) Number: US 4,743,902 C1
(45) Certificate Issued: May 16, 2006

(54) MEASURING DEVICE FOR CAPACITIVE DETERMINATION OF THE RELATIVE POSITION OF THE TWO WITH RESPECT TO ONE ANOTHER MOVABLE PARTS

(75) Inventor: Nils I. Andermo, Taby (SE)

(73) Assignee: C.E. Johansson AB, Eskilstuna (SE)

Reexamination Request:
No. 90/007,008, Apr. 19, 2004

Reexamination Certificate for:
Patent No.: 4,743,902
Issued: May 10, 1988
Appl. No.: 06/942,016
Filed: Dec. 12, 1986

Related U.S. Application Data

(63) Continuation of application No. 06/558,427, filed on Dec. 6, 1983, now abandoned, which is a continuation of application No. 06/272,072, filed on Jun. 9, 1981, now Pat. No. 4,420,754, which is a continuation of application No. 05/964,961, filed on Nov. 30, 1978, now abandoned.

(30) Foreign Application Priority Data

Dec. 9, 1997 (SE) .............................................. 7714010

(51) Int. Cl.
*G01R 27/26* (2006.01)
*G08B 13/26* (2006.01)
*G08C 19/16* (2006.01)

(52) U.S. Cl. ........................ 324/660; 324/683; 340/562; 340/870.01

(58) Field of Classification Search ................. 324/660, 324/683, 690; 340/562, 870.01; 318/662
See application file for complete search history.

(56) References Cited

U.S. PATENT DOCUMENTS

| | | | |
|---|---|---|---|
| 3,845,377 A | | 10/1974 | Shimotori .................... 318/662 |
| 3,961,318 A | * | 6/1976 | Farrand et al. .............. 324/660 |
| 4,420,754 A | * | 12/1983 | Andermo .................... 324/660 |

* cited by examiner

Primary Examiner—Anjan Deb

(57) ABSTRACT

A system for measuring the relative movement of one object with respect to another, such as the movement of a slide with respect to a scale of a measuring instrument utilizes the capacitative effect of a series of electrodes associated with a slide and another series of electrodes associated with the cooperating scale, the changes in capacity caused by relative movement between the two members being analyzed by an electronic circuit.

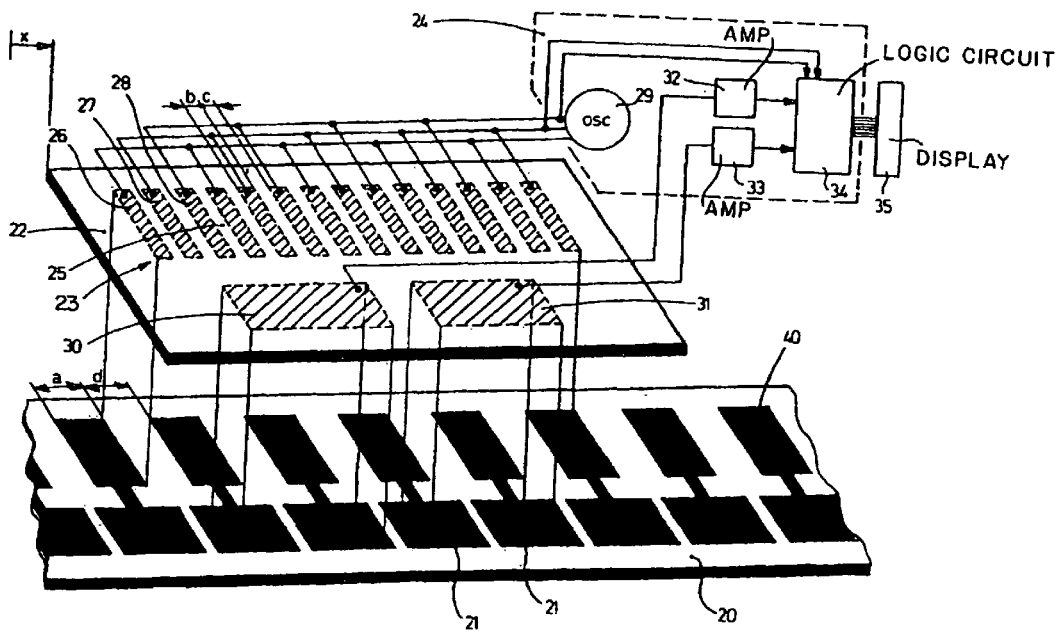

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

\* \* \* \* \*